3,526,474
ABRASION-RESISTANT DURABLY-PRESSED
CELLULOSIC TEXTILES
Wilson A. Reeves and Carl Hamalainen, Metairie, Hubert H. St. Mard, New Orleans, and Albert S. Cooper, Jr., Metairie, La., assignors to the United States of America as represented by the Secretary of Agriculture
No Drawing. Filed Sept. 30, 1966, Ser. No. 584,068
Int. Cl. D06m 13/38, 13/54, 15/72
U.S. Cl. 8—116.3                    1 Claim

ABSTRACT OF THE DISCLOSURE

A process for imparting abrasion resistance, wrinkle resistance, crease retention, and durable press properties to textiles containing at least about 25% cellulosic fibers is disclosed. The process involves treating the fabric with N-methylol or N-methoxymethyl crosslinking agents, in the presence of a polymerization catalyst, and later impregnating the treated fabric with an acid latent catalyst, and drying. The second cure can be postponed while the fabric is stored for periods of about from 0 to 12 months.

---

A non-exclusive, irrevocable, royalty-free license in the invention herein described throughout the world for all purposes of the United States Government with the power to grant sublicenses for such purposes is hereby granted to the Government of the United States of America.

This invention relates to a process for producing cellulosic fabrics having a high degree of wet and conditioned wrinkle recovery, and a high degree of abrasion resistance. More specifically this invention relates to a process for imparting a high degree of wet and conditioned wrinkle recovery to cellulosic fabrics by treating the said fabrics with water soluble amino formaldehyde condensation products wherein the reaction of aminoformaldehyde condensation products is catalyzed with certain polymerization catalysts in the initial step of the process and catalyzed with a crosslinking catalyst (latent acid catalyst) in a subsequent, final process. For purposes of the present invention the term "amino formaldehyde condensation products" refers to water soluble compounds formed by the reaction of formaldehyde with an amine to produce compounds capable of reacting with cellulose.

The term crosslinking agent as used herein refers to N-methylol and N-methoxymethyl compounds which are di- or poly-functional with respect to their ability to react with cellulose.

In general terms, the process of this invention is a two-step process and can be described as follows:

Step 1: Impregnating cellulosic fabric with an aqueous solution containing an amino formaldehyde condensation product, a polymerization catalyst, and textile modifying chemical agents selected for the specific end use in mind, drying and heating the fabric at temperatures about from 185° to 360° F., for periods of time about from 1 to 8 minutes, using the lower temperatures with the longer periods of time, to polymerize the crosslinking agents inside the cellulosic fiber. The fabric may be rinsed to remove salts and unreacted crosslinking agents if desired, and dried.

Step 2: The fabric treated in Step 1 is further treated by impregnating the said fabric with a solution containing a crosslinking catalyst and textile modifying chemical agents selected for the specific end use in mind, drying and heating the fabric at temperatures about from 220° to 340° F. for periods of time about from 1 to 8 minutes, using the lower temperatures with longer periods of time. If desired, the impregnated, uncured fabric can be stored for periods of time about from 0 to 12 months or made into garments, creased if desired, then cured at the elevated temperature. The treatment reduces seam pucker, imparts shape-holding properties, and imparts wet and conditioned wrinkle recovery properties.

We have discovered that through the use of certain nitrogenous compounds, catalyzed with specific polymerization catalysts, so as to fix a specific quantity of amino formaldehyde condensation products in cellulosic fabrics thereby imparting specific properties to the treated textile the said textile can be given specific properties when subsequently cured with conventional catalysts which properties cannot be obtained by treating a cellulosic textile by conventional processes.

The cellulosic textiles resulting from Step 1 of the process of this invention have the following characteristics:

(a) Contain a weight add-on of the amino formaldehyde condensation product, after a thorough rinse in water, of at least 2%, (b) Exhibit moderate improvement in wet wrinkle recovery, and modest improvement in conditioned wrinkle recovery, (c) Exhibit only a slight reduction in breaking strength, or in tear strength, (d) Exude little or no odor of formaldehyde, (e) Respond to cellulosic solvents, such as cupriethylenediamine hydroxide and cupriammonium hydroxide, by either substantial swelling the fiber or partially dissolving, and (f) Respond to treatment with direct cotton dyes and to treatment with vat dyes in that they can be dyed readily utilizing the common procedures.

The cellulosic textiles resulting from Step 2 of the process of this invention have the following characteristics:

(a) Contain a weight add-on of the amino formaldehyde condensation product, after a thorough rinse in water, of at least 2%.

(b) Exhibit a high degree of improvement in both wet and conditioned wrinkle recovery, (c) Exhibit a good degree of improvement in wash-wear rating, at least 4 when washed and tumble-dried, (d) The cellulosic fibers removed from fabrics have high elongation and breaking strength as compared to fibers removed from fabric treated with the same crosslinking agents using conventional catalyst and processing conditions, (e) Exude little or no odor of formaldehyde, (f) Exhibit a high degree of resistance to abrasion, and (g) Respond to cellulosic solvents, such as cupriethylenediamine hydroxide (cuene) and cupriammonium hydroxide, by swelling to a moderate degree.

The cellulosic fabrics treated by process of this invention find utility in the fabrication of garments such as trousers, shirts, blouses, dresses, and the like; yardgoods, sheets, pillow-cases and drapes; and many other textile materials which require or benefit from wrinkle resistance, or such materials as have need for creases and shape-holding properties.

One object of this invention is to provide a process for imparting a high degree of wet and conditioned wrinkle recovery to cotton and other cellulosic textiles.

A second object of this invention is to produce textiles useful in the manufacture of garments that do not release excessive quantities of formaldehyde during storage, nor during the final curing used to set creases, develop conditioned and wet wrinkle resisance, and set shape-holding properties in the garment.

A third object of this invention is to provide cotton and other cellulosic textiles with durable and shape-holding properties, which also exhibit a high degree of abrasion resistance.

A fourth object of this invention is to provide a two-stage process wherein a crosslinking agent is polymerized inside cellulosic fiber by use of polymerization catalyst during the first step, the fabrics resulting from this step having good dyeing and storage properties.

A fifth object of this invention is to provide a process for imparting durable creases, shape-holding properties, and a high degree of both wet and conditioned wrinkle recovery onto cellulosic fabrics and onto fabrics containing cellulosic fibers or blends of cellulosic fibers with other fibers.

Other objects and advantages and uses of this invention will become apparent to those skilled in the art as the details of the invention are disclosed in the specification.

The amino formaldehyde condensation products suitable for use in this invention, which henceforth shall be referred to as crosslinking agents, include the water soluble N-methylol and N-methoxymethyl derivatives of urea, cyclic ethylene urea, alkyltriazones, cyclic propylene urea, 4,5-dihydroxy cyclic ethylene urea, alkyl carbamates, triazines, urone, thiourea, and closely related products.

The compounds or cross linking agents useful in this invention have in many cases already found wide use in the textile industry for the production of wash-wear cellulosic fabrics, thus the agents suitable for use in this invention are not critical because the process is practiced in this invention is workable on a wide variety of amino formaldehyde condensation products.

A very important feature of the invention is the use of polymerization catalysts and N-methylol or N-methoxymethyl compounds to form polymers inside cellulosic fibers by use of a high temperature dry cure to produce modified cellulosic textile fibers that can subsequently be treated with conventional catalysts and heat cured at a high temperature to produce textiles that have high abrasion resistance, high wrinkle recovery and in which the fibers have high elongation, strength, and high swellability as compared to those from cellulosic textiles treated with the same crosslinking agents in a one-step process consisting of impregnation of the fabric with crosslinking agent, a catalyst and other textile modifiers, drying and curing at an elevated temperature as is done now by the textile finishing industry in the production of wrinkle resistant, wash-wear and durable press cellulosic textile goods.

The term "polymerization catalyst" as used in the specification of this invention refers to a compound which predominantly promotes homopolymerization, or copolymerization where a mixture of the amino formaldehyde condensation products are present, to produce insoluble products inside the cellulosic fiber rather than promote reaction of the amino formaldehyde product with the cellulose which is always present in excessive quantities. There will be some reaction between cellulose and the N-methylol and N-methoxymethyl compounds. Examples of the said catalysts suitable for use in this invention include zirconium acetate, aluminum acetate, lead acetate, manganese acetate, cupric acetate, magnesium acetate, and zinc acetate. A requirement for the polymerization catalysts to be suitable for use in the process of this invention is that the catalysts be salts of a weak acid and a weak base.

Acetic acid is not suitable for use in Step 1 of this invention because it promotes polymerization of the amino formaldehyde condensation products, especially those made from triazines and urea, in the aqueous treating solution before the agents are applied to the cellulosic fabric. This leads to stiffness of the treated fabric which is highly undesirable. Other acids which are also not suitable for use in Step 1 are lactic, formic, tartaric, oxalic, phosphoric, sulfuric, and hydrochloric. These, too, cause polymerization of the aqueous solution of the amino formaldehyde condensation mixture. These catalysts impart a high degree of dry wrinkle recovery, but the treated fabrics resulting from their inclusion do not exhibit improved abrasion resistance and other desired properties described in the characterization of the fabric after Step 1.

Salt catalysts such as the ammonium, magnesium, and zinc salts of sulfuric, hydrochloric, nitric, and phosphoric acids are not suitable in Step 1 of this invention because these salts impart a high degree of dry wrinkle recovery to the fabric and the fabric resulting from Step 2 of this invention does not exhibit good abrasion resistance. Those skilled in the art know that the use of the catalysts mentioned yield cellulosic fabrics with suitable conditioned wrinkle recovery but poor abrasion resistance and the treated fabrics cannot be easily creased so that the creases remain sharp after repeated laundering.

The fabrics found suitable for use in this invention are those which contain at least about 25% cellulosic fibers such as cotton, ramie, and rayon, which contain a plurality of cellulosic hydroxyls. The fabrics used with this invention may contain 100% cellulosic fiber. The other portion of the textile used with the cellulosic fibers may be of the polyamide, polyester, polypropylene or polyacrylic type, or even blends of these synthetic fibers. The structure of the textile is not critical, however, the best results have been obtained with fabrics weighing about from 2 to 13 ounces per square yard, and having a textile structure suitable for apparel and household uses.

In accordance with this invention the fabrics used in practicing the invention may be dyed before processing, or they may be dyed after Step 1 of the process. The process is applicable to fibers and to yarns as well as fabrics. The fibers can be entirely cellulosic or they can be blends wherein a major portion of the composition of the textile is cellulosic. When the process is applied to nonwoven fibers, these fibers can be processed into textiles after Step 1 of the process, and garments thereafter; then creased, and cured, in accordance with Step 2 of the process. Textiles made by the process of this invention can be dyed either in the yarn or the fabric form before Step 2 of the process is carried out.

When the process of this invention is applied to yarn the treated yarn can be crimped and set so as to impart stretch and bulk qualities after Step 1 of the process . . . between Steps 1 and 2 of the process, that is. For example, yarns processed through Step 1 are treated with a crosslinking catalyst, such as zinc nitrate, then passed through a false-twisting apparatus which will heat-cure the yarns in a highly twisted state so as to set the yarns and impart crimp, stretch, and bulk.

The amount of crosslinking agent fixed inside the cellulosic fiber in Step 1 of this process can range about from 2% to 14% weight add-on of the crosslinking agents without appreciably altering the abrasion resistance. This discovery is in contrast to what is observed when cellulosic textiles are processed according to conventional processes. In conventional processes the abrasion resistance of the cellulosic textiles decreases rapidly as the amount of crosslinking agent fixed in the cellulosic fiber increases. This reduced abrasion resistance encountered in existing processes has made it impossible to produce textiles and garments with adequate abrasion resistance while at the same time exhibiting adequate crease retention and wrinkle resistance to produce durably pressed goods, such as men's trousers containing only cellulosic fibers.

The prior art teaches that many amino formaldehyde condensation products can be used to treat cellulosic textiles to impart wet and dry wrinkle recovery. Several million yards of cellulosic textiles and blends containing cellulosic fibers are treated each week with these crosslinking agents to impart wash-wear properties, that is, textiles exhibiting wet and conditioned wrinkle recovery. In the prior art one finds that cellulosic fabrics and fabrics containing at least about 25% cellulosic fibers blended with other fibers are generally impregnated with a solution containing the water-soluble amino formaldehyde condensation product, a catalyst, and other textile modifiers as desired, dried, then heated at temperature of about 320° F. for suitable periods of time. The resulting fabrics of this prior art generally have conditioned wrinkle recovery angles about from 250 to 290° (warp plus filling) and wet wrinkle recovery angles from about 240 to 280° (warp plus filling). The predominantly cellulosic textiles treated by current processes, which exhibit the highest degree of conditioned wrinkle recovery, are characterized by poor abrasion resistance as measured by many laboratory tests and actual garment-wear tests. The fabrics so produced exhibit about 40 to 50% reduction in breaking strength and in tear strength. The catalysts used in these conventional processes are either strong acids or salts of strong acids and weak bases. Examples of these strong acids are: hydrochloric acid, nitric acid, phosphoric acid, formic acid, citric acid, and tartaric acid. Examples of salts of the strong acids and weak bases are: magnesium chloride, zinc nitrate, ammonium chloride, zinc fluoborate, ammonium sulfate, aluminum chloride, and organic amine hydrochloride.

The prior art teaches the use of amino formaldehyde condensation product for the production of wrinkle resistant fabrics. The technique used in most instances is to impregnate the fabric with an aqueous solution containing the crosslinking agent, a catalyst, and various textile modifiers, drying the textile at a relatively low temperature of about from 140° to 195° F., and curing at an elevated temperature of about from 285° to 320° F. Alternately, the impregnated fabric can be dried and cured in a single step at the elevated temperatures. In some instances the dried but not cured textile fabrics are made into garments and then cured. When done in accordance with this procedure the literature teaches that it is important to avoid polymerization of the amino formaldehyde condensation product during the drying step. The literature also teaches that the water soluble amino formaldehyde condensation products can be fixed in wet cellulosic fibers by various techniques such as by use of steam. Cotton fabric treated in accordance with this steam technique exhibit very little if any improvement in conditioned wrinkle recovery, as measured by the Monsanto Method. Fabrics processed in accordance with the techniques of this prior art, described above, which do impart substantial improvement in dry wrinkle recovery likewise do contribute substantial losses in fiber breaking strength and elongation, and abrasion resistance of fabric as compared to the untreated cellulosic fibers and (control) fabric. The reduction in abrasion resistance caused by the current processes is well known and has resulted in the use of blends of polyamide and polyester fibers with cotton and rayon for manufacture of wrinkle-resistant garments, especially trousers for men and boys.

The concentration of the polymerization catalyst required for Step 1 of the present invention can range about from 1% to 10%, based on the weight of the treating solution. If the pH of the aqueous solution of the crosslinking agent is above 5 before the polymerization catalyst is added acetic acid may be added to reduce the pH to about 5. The reduction in pH of the treating solution is desirable because some polymerization catalysts of this invention such as zinc acetate may precipitate when added to the solutions having a pH much above 5. Care should be exercised in adjusting the pH of the solution because the addition of an excess of acetic acid may lead to polymernzation and subsequent precipitation of the crosslinking agent before the agent is applied to the fabric. Zirconium acetate, suitable for use in this invention, may contain acetic acid because the acid is needed to stabilize the zirconium acetate in aqueous solution.

When specific effects are desired in the finished goods various textile modifiers can be added to the textiles produced by the process of this invention. The various textile modifiers, such as softeners, lubricants, and certain polymers, which do not penetrate the cellulostc fiber appreciably, can be used along with the crosslinking agent and catalyst to impart improved or modified properties to the textile goods. For example, it is often desirable to add a small amount of emulsifiable polyethylene, polypropylene, silicones, urethanes, or other polymers, because these can impart softer hand, improve tear strength, and even improve abrasion resistance of the resulting textile fabrics. Wetting agents are particularly desirous when grey fabrics are being treated or when textiles exhibiting poor wetting properties are being treated. These textile modifiers can be added in Step 1 of the process, along with the polymerization catalyst or it can be added in Step 2 with the conventional acid catalyst.

Application of chemicals to the textile goods in accordance with Step 1 of the process of our invention is generally accomplished by padding and squeezing off the excess solution. The weight add-on of the solution can be varied considerably. The preferred weight pickup is about from 50% to 90%, based on the weight of the textile goods. The drying of the textiles in Step 1 of the process can be carried out at about from 140° to 195° F. for the period of time required to dry the fabric to about from 5% to 15% moisture content. The drying step need not be carried out separately. Drying and curing can be done simultaneously. When the drying and the curing steps are combined the curing temperatures are preferred. Curing can be done at temperatures about from 250° F. to 340° F. at times about from 1 to 8 minutes.

In Step 2 of the process of this invention the crosslinking catalyst, together with the selected textile modifier, is applied to the fabric by some convenient method to deposit the required amount of catalyst, and then the fabric is dried. When the dried fabric or other textile goods are not to be cured within a relatively short period of time the fabric should be dried to about from 5% to 15% moisture content. When the fabric is to be cured immediately after drying, the curing step can be combined with the drying step, and the curing temperature is employed in the combined operation. The curing temperatures can range about from 265° to 360° F., and the time about from 1 to 8 minutes. The preferred curing temperature is about 320° F. for about from 2 to 4 minutes.

It is believed that all of the amino formaldehyde condensation products of this invention homopolymerize or copolymerize when mixtures of them are used, inside the cellulosic fibers and also become attached to the cellulose through a primary valence bond, without appreciable crosslinking of the cellulose molecules. This view is supported by the fact that (a) cross sections of fibers from treated textiles show the nitrogenous materials to be inside the fiber, (b) the cellulosic textile fabrics resulting from Step 1 of the process of this invention are swelled appreciably largely dissolved by cellulosic solvents such as cupriethylenediamine hydroxide and cupriammonium hydroxide, but do not completely dissolve in these solvents. The cellulosic molecules are apparently not crosslinked appreciably because they do not exhibit significant improvements in conditioned wrinkle recovery even though the crosslinking agents were cured in the fabrics in Step 1 at elevated temperatures.

It is believed that in Step 2 of this invention the crosslinking catalysts initiate further reaction between the cellulose and the nitrogenous polymer to further insolubilize the fiber and to impart additional conditioned wrinkle recovery.

The following examples are submitted to illustrate the the invention and are not meant to limit the invention in any manner whatever.

EXAMPLE 1

A sateen cotton fabric of 7 ounce-per-square-yard weight was submitted to the two-step process of this invention as indicated here:

Step 1: A sample of the cotton fabric was weighed and padded with an aqueous solution containing the indicated percentages of the stated ingredients, as follows:

| | Percent |
|---|---|
| Methylated methylol-sym-1,3,5-triaminotriazine | 16.0 |
| Dimethylol-4,5-dihydroxycyclicethylene urea | 15.0 |
| Zirconyl acetate | 7.5 |
| Acetic acid | 2.0 |
| An alkylarylpolyether alcohol wetting agent | 0.2 |

The padded sample had a wet-pickup of 71%. The fabric sample was dried on a tenter frame for 3 minutes at 180° F., cured 3 minutes at 320° F., washed and dried, and weighed. The final weight add-on was 12.4%.

This sample was marked A and submitted to textile testing, results of which are shown in Table I. Very little improvement was noted as relates to the wrinkle recovery tests which were made at standard conditions (70° F. and 65% relative humidity) according to A.S.T.M. Method D1295-60T; however, when a similar test was made using specimens wetted by placing the specimens in water with 0.1% of a wetting agent (non-ionic) at 150° F. for 5 minutes, the improvement was significant.

Step 2: A portion of treated sample A was padded with an aqueous solution of 0.7% zinc nitrate hexahydrate. This portion was then dried at 180° F. for 3 minutes and cured at 320° for 8 minutes. This portion was washed, dried, and marked A-1, then submitted to textile testing, results of which are shown in Table I. A significant increase in wrinkle recovery, from 211° to 274° (warp plus filling angles), was obtained in the conditioned test while a 20° increase was obtained in the wet test. Good tear strength and abrasion resistance was obtained.

Another portion of treated sample A was padded with an aqueous emulsion containing 0.7% zinc nitrate hexahydrate and 2% emulsified mixture of polyethylene and polypropylene. The fabric was dried as in Step 1 and cured 8 minutes at 320° F., then washed and dried. This portion of the sample was marked A-2 and submitted to textile testing, results of which are shown in Table I. The wrinkle recovery values obtained were 292° for the conditioned and 290° for the wet tests. These were both considered significant improvements over the values obtained for samples A and A-1. The resistance to abrasion was improved, even though sample A-2 had a much higher conditioned wrinkle recovery value. The tear strength values obtained were of particular interest. This specific treatment imparts good wrinkle resistance without introducing the loss in tear strength which is common to this type treatment. These values may be seen in sample comparisons in Table I.

For comparative study a piece of the untreated 7 ounce-per-square-yard sateen cotton fabric was processed by a conventional method with an aqueous solution containing the indicated percentages of the stated ingredients, as follows:

| | Percent |
|---|---|
| Dimethylol-4,5-dihydroxycyclicethylene urea | 10 |
| Zinc nitrate hexahydrate | 2 |
| Emulsified mixture of polyethylene and polypropylene | 2 |

The fabric was dried at 180° F. and cured 8 minutes at 320° F., then washed and dried. Wrinkle recovery values were 296° and 284° for the conditioned and wet tests, respectively. The fabric failed after 478 flex cycles (warp and filling). This particular portion was compared with the corresponding portion of the sample of our invention, since both contain a softener. The portion of fabric which is comparable (ours) yielded values ranging from 565 to 1113, as illustrated in Tables I, II, III, and IV.

EXAMPLE 2

A sateen cotton fabric of 7 ounce-per-square-yard weight was submitted to the two-step process of this invention as indicated here:

TABLE I

| Fabric | Weight add-on, percent | Flex abrasion (W+F), cycles | Elmendorf tear (W+F), gms. | Grab B.S. (W+F), lbs. | Wrinkle recovery angle (W+F) | |
|---|---|---|---|---|---|---|
| | | | | | Cond. | Wet |
| A | 12.4 | 497 | 1,766 | 239 | 211 | 263 |
| A-1 | | 275 | 1,340 | 168 | 274 | 282 |
| A-2 | | 638 | 2,434 | 154 | 292 | 290 |
| Untreated | | 1,272 | 2,983 | 254 | 208 | 203 |

A—Treated with a mixture of methylated methylol-sym-1,3,5-triaminotriazine and dimethylol-4,5-dihydroxy-cyclicethylene urea (1:1). A-1—Fabric from A above treated with zinc nitrate. A-2—Fabric from A above treated with zinc nitrate and softener.

Step 1: A sample of the cotton fabric was weighed, and padded with an aqueous solution containing the indicated percentages of the stated ingredients, as follows:

| | Percent |
|---|---|
| Methylated methylol-sym-1,3,5-triaminotriazine | 16.0 |
| Dimethylolethylcarbamate | 16.0 |
| Zirconyl acetate | 7.5 |
| Acetic acid | 2.0 |
| An alkylarylpolyether alcohol wetting agent | 0.2 |

The padded sample had a wet-pickup of 71%. The fabric sample was dried on a tenter frame for 3 minutes at 180° F., cured 3 minutes at 320° F., then washed and dried, and weighed. The final add-on was 7.5%.

This sample was marked B and submitted to textile testing, results of which are shown in Table II. The condition wrinkle recovery value was not improved by the treatment. The value obtained was 191° while the untreated sateen value was 208°. The wet wrinkle recovery value was increased to 243°. The treatment caused very little reduction in the tear strength while imparting good abrasion resistance.

Step 2: A portion of treated sample B was padded with an aqueous solution of 0.7% zinc nitrate hexahydrate, dried and cured as in Step 2 of Example 1. The portion was washed and dried and submitted to textile testing, results of which are shown in Table II. The zinc catalyst treatment caused a significant improvement in conditioned wrinkle recovery values. The conditioned and wet wrinkle recovery values were 245° and 270°, respectively.

Another portion of treated fabric sample B was padded with an aqueous emulsion containing 0.7% zinc nitrate hexahydrate and a 2% emulsified mixture of polyethylene and polypropylene. The wet pickup was 70%. The fabric was dried and cured, then dried and washed as in Step 2 of Example 1, and submitted to textile testing, results of which are shown in Table II. Sample was marked B-2.

The conditioned wrinkle recovery values were increased from 191° to 284° by the cure. Wet recovery values were increased from 243° to 290°. Of particular significance was the high tearing strength and abrasion resistance values obtained. It was noted that fabric sample B-2 exhibited higher tear strength than that of the untreated cotton fabric. The abrasion resistance as measured by the flex test was essentially that of the untreated control. This is particularly outstanding considering the fact that this fabric had a very high wrinkle recovery.

TABLE II

| Fabric | Weight add-on percent | Flex abrasion (W+F), cycles | Elmendorf tear (W+F), gms. | Grab B.S. (W+F), lbs. | Wrinkle recovery angle (W+F) Cond. | Wet |
|---|---|---|---|---|---|---|
| B | 7.5 | 515 | 2,200 | 249 | 191 | 243 |
| B-1 | | 381 | 1,620 | 178 | 245 | 270 |
| B-2 | | 1,113 | 3,533 | 160 | 284 | 290 |
| Untreated | | 1,272 | 2,983 | 254 | 208 | 203 |

B—Treated with a mixture of methylated methylol-sym-1,3,5-triaminotriazine and dimethylolethylcarbamate (1:1). B-1—Fabric from B above treated with zinc nitrate. B-2—Fabric from B above treated with zinc nitrate and softener.

EXAMPLE 3

A sateen cotton fabric of 7 ounce-per-square-yard weight was submitted to the two-step process of this invention as indicated here:

Step 1: A sample of the cotton fabric was weighed and padded with an aqueous solution containing the indicated percentages of the stated ingredients, as follows:

|  | Percent |
|---|---|
| Methylated methylol-sym-1,3,5-triaminotriazine | 16.0 |
| Dimethylol-4,5-dihydroxycyclicethylene urea | 7.0 |
| Zirconyl acetate | 7.5 |
| Aetic acid | 2.0 |
| An alkylarylpolyether alcohol wetting agent | 0.2 |

The padded fabric sample had a wet-pickup of 70%. The drying, curing, washing, etc., steps were done as in the case of fabric sample A, Example 1. The fabric sample was marked C and submitted to textile testing, results of which are shown in Table III. The weight add-on was 10.5%. The conditioned wrinkle recovery test values indicated that Step 1, again, did not improve the conditioned wrinkle resistance of the fabric; however, a modest increase was noted in the values obtained in testing the wet specimens.

Step 2: A portion of treated sample C was padded with an aqueous solution of 0.7% zinc nitrate hexahydrate, and dried and cured exactly as in the procedure for producing fabric sample A-1, in Example 1. This fabric portion was marked C-1. Test data for this sample are shown in Table III. The wrinkle recovery values were 279° for the conditioned test, and 286° for the wet test. The C-1 fabric sample exhibited a very high degree of smooth drying properties after it was washed and tumble dried. The same properties were observed when a sample was washed and hung to air dry.

TABLE III

| Fabric | Weight add-on percent | Flex abrasion (W+F), cycles | Elmendorf tear (W+F), gms. | Grab B.S. (W+F), lbs. | Wrinkle recovery angle (W+F) Cond. | Wet |
|---|---|---|---|---|---|---|
| C | 10.5 | 423 | 1,916 | 237 | 224 | 266 |
| C-1 | | 275 | 1,380 | 168 | 279 | 280 |
| C-2 | | 565 | 2,750 | 154 | 299 | 291 |
| Untreated | | 1,272 | 2,983 | 254 | 208 | 203 |

C—Treated with a mixture of nethylated methylol-sym-1,3,5-triaminotriazine and dimethylol-4,5-dihydroxycyclicethylene urea (2:1). C-1—Fabric from C above treated with zinc nitrate. C-2—Fabric from C above treated with zinc nitrate and softener.

Another portion of the treated sample C was padded with an aqueous emulsion containing 0.7% zinc nitrate hexahydrate and 2% of emulsified mixture of polyethylene and polypropylene. The fabric was dried, cured, washed and again dried as sample portion A-2. This particular portion was marked C-2, and submitted to textile testing, results of which are shown in Table III. The wrinkle recovery data of this portion showed 299° and 291° values for conditioned and wet, respectively. The tear strength was the same as that of the untreated cotton sateen. The abrasion resistance values of sample C-2 were very high considering the high degree of wrinkle recovery of the same portion.

EXAMPLE 4

A sateen cotton fabric of 7 ounce-per-square-yard weight was submitted to the two-step process of this invention as indicated here:

Step 1: A sample of the cotton fabric was weighed and padded with an aqueous solution containing the indicated percentages of the stated ingredients, as follows:

|  | Percent |
|---|---|
| Methylated methylol-sym-1,3,5-triaminotriazine | 25.0 |
| Zirconyl acetate | 7.5 |
| Acetic acid | 2.0 |
| An alkylarylpolyether alcohol wetting agent | 0.2 |

The padded sample had a wet-pickup of 70%. The drying, curing, washing, etc. were carried out as in the procedure of fabric A, Example 1. This particular sample had a weight add-on of 10.0%. The sample was marked D and submitted to textile testing, results of which are shown in Table IV. No improvement in conditioned wrinkle recovery values were obtained; however, the wet test values did show some improvement, when compared to the wrinkle resistance values for the untreated cotton fabric.

Step 2: A portion of treated Sample D was padded with an aqueous solution of 0.7% zinc nitrate hexahydrate, and dried and cured exactly as in the procedure for producing fabric sample A-1, in Example 1.

TABLE IV

| Fabric | Weight add-on, percent | Flex abrasion (W+F), cycles | Elmendorf tear (W+F), gms. | Grab B.S. (W+F), lbs. | Wrinkle recovery angle (W+F) Cond. | Wet |
|---|---|---|---|---|---|---|
| D | 10.0 | 446 | 1,900 | 221 | 195 | 255 |
| D-1 | | 255 | 1,440 | 176 | 277 | 283 |
| D-2 | | 589 | 2,971 | 152 | 298 | 282 |
| Untreated | | 1,272 | 2,983 | 254 | 208 | 203 |

D—Fabric treated with methylated methylol-sym-1,3,5-triaminotriazine. D-1—Fabric from D above treated with zinc nitrate. D-2—Fabric from D above treated with zinc nitrate and softener.

This fabric portion was marked D-1. The cure with the zinc nitrate catalyst improved the conditioned and the wet wrinkle recovery values significantly, the latter up to 283°. See Table IV.

Another portion of treated Sample D was padded with an aqueous emulsion containing 0.7% zinc nitrate hexahydrate and 2% of an emulsified mixture of polyethylene and polypropylene. The fabric was dried, cured, and washed and dried as sample portion A-2. This sample portion was marked D-2 and submitted to textile testing, results of which are shown in Table IV. The wrinkle recovery values were 298° and 282°, conditioned and wet, respectively. Of particular interest was the fact that the tear strength of the portion D-2 was equal to that of the untreated fabric while the D-2 portion exhibited a high degree of abrasion resistance, considering the high degree of wrinkle recovery exhibited by the treated portion.

EXAMPLE 5

Samples of 80 x 80 printcloth were treated with the same treating solution as used for Examples 1, 2, 3, and 4. The polymer weight add-on was higher because of a higher wet add-on in the printcloth over that of the 7 ounce sateen used in the former examples. The data in Table V gives the flex abrasion and wrinkle recovery both conditioned and wet for these samples. The flex abrasion is considerably improved over that of the fabric given the conventional treatment even at the high level of wrinkle recovery.

TABLE V

| 80 x 80 printcloth | Weight add-on, percent | Flex abrasion (W+F), cycles | WRA (W+F) Cond. | Wet |
|---|---|---|---|---|
| (A) MMM/DHDMEU (16:15) | 19.2 | 921 | 297 | 265 |
| (B) MMM/DMEC (16:16) | 12.1 | 908 | 294 | 256 |
| (C) MMM/DMDMEU (16:7) | 16.0 | 998 | 284 | 250 |
| (D) MMM (25%) | 15.5 | 498 | 301 | 290 |
| (E) DHDMEU conventional (10%) | 6.6 | 161 | 309 | 267 |
| (F) Untreated control | | 1,467 | 196 | 175 |

Step I: Pad, dry 3 min. 180° F., cure 3 min. 320° F., wash and dry. Step II: Pad in 0.7% $Zn(NO_3)_2 \cdot 6H_2O$ + 2% softener, dry 3 min. 180° F., cure 8 min. 320° F., wash and dry.

EXAMPLE 6

To illustrate the desirability of polymerization catalysts

Five aqueous solutions were prepared, each of which was similar to the other except for the catalyst employed. Each solution contained 16% of the methylated methylol-sym-1,3,5-triaminotriazine, 16% of a dimethylol 4,5-dihydroxycyclicethylene urea, and a quantity of catalyst. The specific quantity and catalyst applicable to each of the solutions is this:

Solution 1—7.5% magnesium acetate
Solution 2—7.5% magnesium acetate plus 5.5% acetic acid
Solution 3—7.5% zinc acetate
Solution 4—7.5% zinc acetate plus 5.5% acetic acid
Solution 5—13.0% acetic acid A sateen cotton fabric of 8.5 ounce-per-square-yard weight was selected for the series. Five samples were cut and a separate solution selected from each of the above was applied to one of the samples of cotton fabric. The samples were each padded, dried for 3 minutes at 180° F., and cured for 3 minutes at 320° F., then weighed to determine the add-on *before*, and the add-on *after* washing. To do this the treated and dried-and-cured samples were cut exactly in half and one-half of each sample was submitted to the washing, while the other portion was reserved for other testing and evaluation. Some of the data obtained from this investigation is shown in Table VI. It was noted that the maximum add-on of crosslinking agents was 19.1% after wash. It was also noted that some of the orientation catalysts fixed essentially all of the crosslinking agent in the fabric—based on the maximum percent add-on of the crosslinking agent.

The aqueous solutions remaining after the fabrics were treated were allowed to stand at about 81° F. to determine the stability of each of the solutions. Solution 1, which contained only the magnesium acetate as a catalyst, remained clear, without precipitation and without polymer formation for over 24 hours, and was still suitable for treatment of fabric beyond the 24 hours.

Solution 2, which contained magnesium acetate plus acetic acid as a catalyst, deposited insoluble precipitate in much less than 24 hours after preparation, in fact, the solution was suitable for treatment of the fabric for only a few hours after preparation.

Solution 3, which contained zinc acetate remained clear and without polymer formation for over 24 hours after preparation, and was suitable for treatment of fabric even after it had stood for over 24 hours.

Solution 4, which contained zinc acetate plus 5.5% acetic acid deposited an insoluble precipitate in much less than 24 hours, and was not suitable for treatment of fabric after it had stood several hours.

Solution 5, which contained acetic acid as a possible catalyst polymerized to form a colloidal solution within less than 24 hours. The solution was not suitable for treatment of fabric after it had stood a few hours.

TABLE VI

| Sample | Catalyst | Percent | Percent weight add-on Before wash | After wash |
|---|---|---|---|---|
| 1 | Magnesium acetate | 7.5 | 26.2 | 11.4 |
| 2 | Magnesium acetate Acetic acid | 7.5 / 5.5 | 26.7 | 15.1 |
| 3 | Zinc acetate | 7.5 | 25.1 | 18.2 |
| 4 | Zinc acetate Acetic acid | 7.5 / 5.5 | 25.5 | 19.1 |
| 5 | Acetic acid | 13.0 | 19.5 | 16.6 |

Fabrics were padded, dried 3 min. 180° F., cured 3 min. 320° F., then given a process wash.

EXAMPLE 7

To illustrate the concentration of catalyst (1) Conventional treatment: A sateen cotton fabric of 8.5 ounces-per-square-yard weight was padded with a solution containing 16.0% of methylated methylol-sym-1,3,5-triaminotriazine and 2.0% zinc nitrate hexahydrate catalyst. The wet-pickup of this application was 70%. The fabric was dried 3 minutes at 180° F., cured 8 minutes at 320° F., washed, and dried employing the standard procedures. The dry add-on of the crosslinking agent was 6.4%. The wrinkle recovery values obtained were 290° each, for the conditioned and for the wet tests. Abrasion resistance of this particular sample as compared to untreated cotton fabric was exceedingly low. The fabric withstood less than 100 flex cycles of the Stoll Flex Test. This fabric represents what can be described as a conventionally treated wash-wear or durable press fabric since the process is the same as that used in producing such fabrics in the industry.

(2) Series varying the concentration (Step 1): A series of four samples of sateen cotton fabric of 8.5 ounces-per-square-yard weight was padded with a solution containing the solutions prepared for the varying-concentration series.

Four aqueous solutions were prepared, each of which was similar to the other except for the variation in concentration of catalyst employed. Each of the solutions contained 16% methylated methylol-sym-1,3,5-triaminotriazine and a quantity of zinc acetate dihydrate catalyst selected from the group of percentages consisting of 7.5%, 5.0%, 3.0%, and 1.0%.

Each of the four samples padded with one of the solutions was processed in accordance with Step 1 of the invention.

(3) Series varying crosslinking agent (Step 1): A series of two sateen cotton fabric samples of the same weight as the series of four was padded with the dimethylol urea aqueous solutions containing 5.0% and 1.0% zinc acetate dihydrate catalyst concentration. The crosslinking agent concentration was 20% in both cases. Each of the samples was padded with one of the solutions, then processed from there on as before.

Observations: The dry weight add-on of each of the treated samples of items 2 and 3, above, as relates to crosslinking agents varied from 8.0% to 10.2%. This is considerably more than the 6.4% weight add-on obtained in the case of the conventionally treated fabric. The wrinkle recovery values for all these samples are shown in Table VII under Step 1.

solutions of the invention to illustrate the effects of varying curing time and temperature on the finished product. The padding solution contained 16% methylated methylol-sym-1,3,5-triaminotriazine, 15% of dimethylol 4,5-dihydroxycyclicethylene urea, and 7.5 zirconyl acetate. The wet pickup of these samples was in all cases about 70%. The samples were then dried for 5 minutes at 180° F. and cured at the times and temperatures shown in Table VII. The fabrics were then washed and dried. The amounts of crosslinking agent fixed in the fabric samples by the zirconyl acetate catalyst are shown in Table VIII. In this table it can be seen that a substantial amount of the crosslinking agent in the cotton can be fixed at a temperature as low as 212° F. for periods of time as short as 3 min-

TABLE VII

| Sample No. | Cross-linking agent used | Catalyst | Percent add-on | WRA (W+F) Step 1 Cond. | WRA (W+F) Step 1 Wet | WRA (W+F) Step 2 Cond. | WRA (W+F) Step 2 Wet |
|---|---|---|---|---|---|---|---|
| 1 | MMM | 2.0% Zn(NO$_3$)$_2$ | 6.4 | 290 | 291 | | |
| 2 | MMM | 7.5% ZnAc$_2$ | 10.2 | 236 | 245 | 295 | 270 |
| 3 | MMM | 5.0% ZnAc$_2$ | 10.2 | 233 | 238 | 298 | 282 |
| 4 | MMM | 3.0% ZnAc$_2$ | 8.2 | 225 | 196 | 297 | 278 |
| 5 | MMM | 1.0% ZnAc$_2$ | 8.3 | 225 | 218 | 298 | 286 |
| 6 | DMU | 5.0% ZnAc$_2$ | 9.5 | 252 | 262 | 287 | 271 |
| 7 | DMU | 1.0% ZnAc$_2$ | 8.0 | 242 | 251 | 297 | 284 |
| Control fabric | | | | 173 | 177 | | |

Step 1: Pad, dry 5 min. 180° F., cure 3 min. 320° F., wash and dry.
Step 2: Pad with 0.6% Zn(NO$_3$)$_2$. 6H$_2$O plus softener, dry 5 min. 180° F., cure 8 min. 320° F., wash and dry.
MMM—Methylated methylol-sym-1,3,5-triaminotriazine. DMU—Dimethylolurea. WRA—Wrinkle recovery angle.

Step 2: A portion of each of the fabrics prepared by Step 1, above, was then padded with an aqueous emulsion containing 0.6% zinc nitrate hexahydrate and 2% of an emulsified mixture of polyethylene and polypropylene, dried, cured for 8 minutes at 320° F., washed and dried conventionally, then submitted to textile testing, the wrinkle recovery data of which are shown under Step 2 of Table VII.

All concentrations of the zinc acetate used in Step 1 of the process fixed a high percentage of the cross linking agent in the fabric. Samples 2 through 7 were catalyzed with zinc nitrate in Step 2 of the process to produce extremely high conditioned and wet wrinkle recovery.

Observations: The concentration of the polymerization catalyst can be varied about from 1% to 7.5% without significantly altering the dry or wet wrinkle recovery in the fabric finished in Step 2 of this invention. A very high degree of abrasion resistance was exhibited by each of these samples even though these exhibited rather high conditioned and wet wrinkle recovery.

utes. This table also shows that maximum efficiency of fixation of the crosslinking agent in cotton can be obtained at the higher temperatures of about from 285° to 320° F. for times ranging about from 1 to 3 minutes.

Step 2: A portion of each of the nine samples produced in Step 1 of Example 8 was impregnated with an aqueous emulsion containing 0.6% of zinc nitrate and 2% of an emulsified mixture of polyethylene and polypropylene, dried, cured 8 minutes at 320° F., washed and dried, and submitted to wrinkle resistance and stiffness tests, results of which are shown in Table VIII in correlations with the pertinent conditions.

Observation: All the curing times and temperatures employed in Step 1 of the process, as evidenced by the Example 8 evaluations, produced fabrics suitable for use in Step 2 of the invention. High wrinkle resistance values were obtained.

EXAMPLES 8

To illustrate variation in curing time and temperature as relates to Step 1

Step 1: A series of nine samples of sateen cotton fabric of 8.5 ounces-per-square-yard weight was padded with the

TABLE VIII

| Sample | Curing conditions Time (min.) | Curing conditions Temp., °F. | Weight add-on, percent | Step I WRA (W+F) Cond. | Step I WRA (W+F) Wet | Step I Stiffness W | Step I Stiffness F | Step II WRA (W+F) Cond. | Step II WRA (W+F) Wet | Step II Stiffness W | Step II Stiffness F |
|---|---|---|---|---|---|---|---|---|---|---|---|
| 5001: | | | | | | | | | | | |
| 48-1 | 3 | 212 | 5.6 | 151 | 180 | 21 | 23 | 246 | 230 | 10 | 11 |
| 48-2 | 5 | 212 | 5.9 | 145 | 192 | 20 | 24 | 253 | 232 | 10 | 11 |
| 48-3 | 3 | 248 | 7.7 | 152 | 198 | 23 | 26 | 279 | 246 | 10 | 11 |
| 48-4 | 5 | 248 | 9.2 | 157 | 207 | 25 | 28 | 282 | 248 | 10 | 11 |
| 48-5 | 3 | 285 | 12.0 | 156 | 204 | 31 | 27 | 286 | 259 | 14 | 14 |
| 48-6 | 5 | 285 | 13.9 | 168 | 218 | 30 | 30 | 289 | 266 | 15 | 15 |
| 48-7 | 1 | 320 | 10.7 | 155 | 207 | 27 | 28 | 282 | 249 | 14 | 13 |
| 48-8 | 3 | 320 | 15.4 | 172 | 200 | 30 | 30 | 293 | 290 | 18 | 17 |
| 48-9 | 5 | 320 | 17.9 | 199 | 225 | 33 | 31 | 301 | 278 | 19 | 21 |
| Untreated | | | | 173 | 177 | 12 | 14 | | | | |

Step I: Fabric padded, dried 5 min. 180° F., cured as above table, washed and dried.
Step II: ½ of each was padded with .6% Zn(NO$_3$)$_2$ containing 2% softener, dried 8 min., 180° F., cured 8 min. at 320° F., washed and dried.

EXAMPLE 9

To illustrate the effect of varying the curing time and temperature as relates to Step 2

Three sets of samples of sateen cotton of 8.5 ounces-per-square-yard weight were involved in the preparation of this series of experiments to determine the effect of varying curing time and temperature in relation to Step 2 of this invention. In all, eight samples were treated. The samples were impregnated with an aqueous solution containing 16% methylated methylol-sym-1,3,5-triaminotriazine, 5% zinc acetate, and 0.2% of an alkylarylether alcohol wetting agent, to a wet pickup of about 70%, then dried 5 minutes at 176° F. and cured 3 minutes at 320° F., then washed and dried.

were treated with 0.6% zinc nitrate containing 2% softener and dried 8 minutes at 180° F., cured 8 minutes at 320° F., and finally washed and dried.

Observations: Both the dyed and undyed fabrics showed a high degree of wrinkle recovery even at the low level of resin add-on.

TABLE X

| Sample | Resin Solids, percent | Catalyst ZnAc, percent | Weight add-on, percent | Step 1 WRA (W+F) | | Step 2A WRA (W+F) | | Dyed and Step 2B WRA (W+F) | |
|---|---|---|---|---|---|---|---|---|---|
| | | | | Cond. | Wet | Cond. | Wet | Cond. | Wet |
| 1 | 22.5 | 5.0 | 10.4 | 217 | 224 | 288 | 256 | 281 | 261 |
| 2 | 16.9 | 3.75 | 7.7 | 214 | 231 | 281 | 264 | 275 | 248 |
| 3 | 11.2 | 2.5 | 5.3 | 201 | 225 | 273 | 250 | 265 | 243 |
| 4 | 7.5 | 1.67 | 3.8 | 203 | 213 | 277 | 251 | 255 | 231 |
| 5 | 5.6 | 1.25 | 2.8 | 202 | 217 | 267 | 239 | 243 | 235 |
| Untreated | | | | 175 | 163 | | | 172 | 192 |

Step 1: Samples padded, dried 8 min., 180° F., cured 3 min. 320° F., washed and dried.
Step 2A: ½ of each fabric treated with zinc nitrate and softener, dried, cured, washed and dried.
Step 2B: ⅓ of each fabric dyed after Step 1, then treated with zinc nitrate and softener, dried, cured, washed and dried.

Step 2: Each of the above samples, which were produced by Step 1 of this invention, was then padded with an aqueous solution containing 0.6% zinc nitrate hexahydrate and 2% of an emulsified polyethylen-polypropylene mixture (softener) and dried 10 minutes at 180° F., and cured for the specified times and temperature shown in Table IX.

Observation: A wide range of curing times and temperatures can be employed in Step 2 of this invention.

TABLE IX

| Sample | Step II curing conditions | | WRA (W+F) | | Stiffness | |
|---|---|---|---|---|---|---|
| | Time, min. | Temp., °F. | Cond. | Wet | W | F |
| 1 | 5 | 248 | 273 | 236 | 29 | 23 |
| 2 | 10 | 248 | 273 | 284 | 35 | 24 |
| 3 | 3 | 285 | 284 | 261 | 35 | 23 |
| 4 | 5 | 285 | 280 | 258 | 29 | 25 |
| 5 | 10 | 285 | 281 | 259 | 32 | 23 |
| 6 | 3 | 320 | 288 | 269 | 37 | 26 |
| 7 | 5 | 320 | 292 | 263 | 23 | 23 |
| 8 | 8 | 320 | 289 | 256 | 28 | 24 |
| Control | | | 173 | 177 | 12 | 14 |

Step I: Fabrics were padded with 16.5% MMM solution containing 5% zinc acetate to about 70% wet pickup, dried 5 min. 180° F., cured 3 min. 320° F., then washed and dried.
Step II: Fabrics after Step I were padded with 0.6% Zn(NO₃)₂ plus 2% softener, dried about 10 min. 180° F., then cured according to above schedule, then washed and dried.

EXAMPLE 10

To illustrate effect of varying the weight add-on of the finish

Step 1: Five samples of 8 oz. white cotton sateen were padded with an aqueous solution containing varying concentrations of dimethylol 4,5-dihydroxycyclicethylene urea and zinc acetate. The first sample was padded with the first solution, which contained 22.5% of the resin and 5% of the catalyst. The second sample was padded with the diluted same solution. The third sample was padded with the diluted second solution, and so on. In brief, the crosslinking agent and the catalyst were diluted, as shown in Table X. The wet pickup was about 70% for all of the samples. The drying applicable to all was for 8 minutes at 180° F., and curing at 3 minutes at 320° F. The samples were washed and dried, and then evaluated. The resin concentration was varied about from 5.6% to 22.5% and the corresponding weight add-on produced by the treatment was about from 2.8% to 10.4%.

Portions of the treated fabrics after Step 1 were dyed with a direct cotton dye (Salophenyl Brilliant Blue BL) and all were found to accept the dye almost as well as untreated fabric indicating no appreciable amount of crosslinking.

Step 2: Both the dyed and undyed fabrics after Step 1

EXAMPLE 11

Two skeins of 24/2 cotton yarn were impregnated with certain aqueous solutions. The one skein was impregnated with a solution containing 22.5% dimethylol 3,5-dihydroxycyclicethylene urea and 5% zinc acetate. The other skein was impregnated with a solution containing 25% methylated methylol-sym-1,3,5-triaminotriazine and 5% zinc acetate. Both skeins were dried 10 minutes at 180° F. and cured 3 minutes at 320° F. The former skein was marked A, the latter skein was marked B.

The A portion was then divided into three portions and marked A–1, A–2, and A–3. The B portion was then divided into three portions and marked B–1, B–2, and B–3. The A–1 and B–1 skein portions were dyed with a direct cotton red dye (Diphenyl Fast Red 6BF). The A–2 and B–2 skein portions were dyed with a direct cotton blue dye (Salophenyl Brilliant Blue BL). The A–3 and B–3 skein portions were dyed with a direct cotton yellow dye (Diphenyl Fast Yellow RLSW Supra).

Observations: All portions of A and B substantially accepted the dye . . . almost as well as an untreated sample of yarn, and much more readily than a yarn processed by the "conventional treatment." The yarns by the said conventional treatment resisted the dye.

EXAMPLE 12

Seven fabric samples consisting of (1) a group of five samples of different weights of cotton fabric, and (2) two samples of cotton and synthetic fiber blends in fabric form were padded with an aqueous solution containing 20% dimethylol-4,5-dihydroxycyclic ethylene urea, 20% methylated methylolmelamine, and 5% zinc acetate. The said seven fabric samples can be described as follows:

8½ ounce-per-square-yard cotton sateen
7 ounce-per-square-yard cotton sateen
8 ounce-per-square-yard cotton sateen
4 ounce-per-square-yard cotton grey twill
3 ounce-per-square-yard cotton printcloth
light-weight 65% polyester-35% cotton cloth
7 ounce-per-square-yard weight 20% polyamide-80% cotton cloth The wet pickup of the padded samples varied about from 60% to 75%. The fabrics were dried, then cured 3 minutes at 305° F., then washed and dried. The weight increase of these ranged about from 7% to 11%.

Each sample was then impregnated with an aqueous 0.6% zinc nitrate hexahydrate solution and dried. A portion of each was set aside for later use. Another portion was used for making pants cuffs of each, pressed to form creases, and hung to dry-and-cure for 8 minutes at 320° F. The pants cuffs were submitted to standard laundering and examined after each cycle, which was a complete cycle including rinsing and drying. All of the cuffs retained a good crease, excellent smooth-drying properties, and exhibited a high degree of abrasion resistance through 25 cycles of laundering.

properties. Table XI illustrates the improvement in fiber breaking strength and elongation of the polyset process over the conventional durable press process.

TABLE XI

| Fabric source of fibers | Wt. add-on of cross-linking agent | Breaking strength | | Elongation at break | |
|---|---|---|---|---|---|
| | | Grams | Percent of untreated fibers | Percent | Percent of untreated fibers |
| Untreated | None | 5.31 | | 10.2 | |
| Poly-set | 10 | 3.49 | 66 | 6.7 | 66 |
| Conventional durable-press | 6.4 | 2.59 | 49 | 5.8 | 51 |

That portion of each fabric which was impregnated with the zinc nitrate catalyst and set aside was then made into cuffs, having aged 12 weeks. The cuffs did not have a formaldehyde odor. The cuffs were then pressed to form creases and cured 8 minutes at 320° F. When these cuffs were laundered repeatedly, as done with the previous cuffs, the creases remained sharp, and the smooth-drying properties were excellent. In all respect these cuffs performed in a manner equal to those above.

EXAMPLE 13

Another set of samples duplicate to those of Example 12 was padded with an aqueous solution containing 13% dimethylol - 4,5 - dihydroxycyclic ethylene urea, 13% methylated methylolmelamine, 3% zinc acetate, and 2% of a mixture of emulsified polyethylene and polypropylene. The fabrics were dried, and cured 3 minutes at 320° F. The fabrics were then washed and dried. These were then submitted to textile tests, and the tear, tensile, and abrasion resistance of these was found to be essentially the same as the samples before this chemical treatment.

Each of the samples was then impregnated with an aqueous 0.6% zinc nitrate hexahydrate solution, dried, made into pants cuffs, pressed, then cured 8 minutes at 320° F. After repeated launderings these cuffs retained a sharp crease, shape-holding properties, and exhibited excellent smooth-drying properties. The wet and conditioned wrinkle recovery values of the fabrics in these cuffs ranged about from 270° to 290°, even after the fabrics were submitted to 12 standard laundering cycles.

EXAMPLE 14

A sample of 8 oz. white sateen was treated with dimethylol 4,5-dihydroxycyclicethylene urea and zinc acetate in Step I of the process resulting in a polymer weight add-on of about 10%. This fabric was then treated with zinc nitrate and softener as in Step II of the process. A corresponding second fabric sample was treated with the same resin by the conventional procedure using zinc nitrate and softener in the one step process resulting in 6.4% weight add-on. These fabrics were tested for fiber

EXAMPLE 15

Three cotton-synthetic fiber blends were treated by process of this invention. Specifically these blends were (x) an all cottom warp with all viscose rayon filling, (y) an all cotton warp with a 90/10 dacron/cotton filling, and (z) an all cotton warp with a 50/50 nylon/cotton filling. The three blend fabric samples were submitted to treatment with the same solutions, concentrations, and other processing conditions. There was only one uncontrollable condition which was different. The wet pickup of the three was not exactly alike, possibly due to the nature of the fabrics. The wet pickups were as follows;

(x) 82%, (y) 110%, and (z) 109%

This can be considered of no consequence for our purposes.

Step 1: The three cotton-synthetic fiber blend fabric samples were padded with an aqueous solution containing . . . ,

| | Percent |
|---|---|
| Dimethylol 4,5-dihydroxycyclicethyleneurea | 10.8 |
| Zirconyl acetate | 7.5 |
| Acetic acid | 2.0 |
| An alkylarylpolyether alcohol wetting agent | 0.1 |

The impregnated samples were then dried 8 minutes at 180° F., cured 3 minutes at 320° F., and washed and dried by standard methods. Weight add-ons are shown in Table XII. One portion of each was set aside, and one portion was submitted to Step 2 of the invention.

Step 2: Each of the three portions was impregnated with an aqueous solution containing 0.9% zinc nitrate and 2% of an amulsified mixture of polyethylene and polypropylene, then dried 8 minutes at 180° F., cured 8 minutes at 320° F., and washed and dried by standard methods.

Note: The weight add-on reported on the table refers to the dry weight gain after Step 1.

TABLE XII

| Samples treated | Weight add-on, percent | Wrinkle resistance angles (degrees) | | | | | |
|---|---|---|---|---|---|---|---|
| | | Initial | | Step 1 | | Step 2 | |
| | | Cond. | Wet | Cond. | Wet | Cond. | Wet |
| (x) | 8.4 | 198 | 217 | 157 | 239 | 225 | 245 |
| (y) | 10.0 | 254 | 233 | 246 | 247 | 284 | 287 |
| (z) | 10.9 | 218 | 182 | 217 | 223 | 283 | 265 |

(x)—A cotton warp and viscose rayon filling fabric. (y)—A cotton warp and 9-/10 dacron/cotton filling fabric. (z)—A cotton warp and 50/50 nylon/cotton filling fabric.

We claim:
1. A process for imparting abrasion resistance, wrinkle resistance, crease retention, and durable press properties to a textile fabric containing at least about 25% of cellulosic fibers comprising:
   (a) impregnating the cellulosic-fiber-containing fabric with an aqueous solution containing (1) about from 5% to 40% of water-soluble amino formaldehyde condensation product that is homo- or copolymerizable and is also a crosslinker for cellulose, and which is selected from the group consisting of water-soluble N-methylol and N-methoxymethyl derivatives of urea, cyclic ethylene urea, alkyltriazones, cyclic propylene urea, 4,5-dihydroxy cyclic ethylene urea, alkyl carbamates, triazines, urone, and thiourea, and (2) about from 1% to 10% of a polymerization catalyst consisting of an acetate selected from the group consisting of zirconium acetate, aluminum acetate, lead acetate, manganese acetate, cupric acetate, magnesium acetate, and zinc acetate;
   (b) curing the impregnated fabric at a temperature of about from 250° F. to 340° F. for about from 1 to 8 minutes to polymerize the aforesaid condensation product inside the cellulosic fibers to a weight add-on of about from 2% to 14%;
   (c) washing the resulting fabric free from unreacted impregnating agents with water and drying it;
   (d) impregnating the dried fabric from step (c) with a solution containing a textile softening agent and about from 0.6 to 2.0% of a latent acid catalyst selected from the group consisting of magnesium chloride, zinc nitrate, ammonium chloride, zinc fluoborate, ammonium sulfate, aluminum chloride, and organic amine hydrochloride; and
   (e) curing the impregnated fabric of step (d) as in step (b) or postponing said cure for a period of time up to about 12 months.

References Cited
UNITED STATES PATENTS 3,138,802   6/1964   Getchell _____ 2—243

FOREIGN PATENTS 162,656   12/1952   Australia.
955,088   4/1964   Great Britain.

MAYER WEINBLATT, Primary Examiner

M. HALPERN, Assistant Examiner